Patented Feb. 29, 1944

2,342,865

UNITED STATES PATENT OFFICE 2,342,865

ALKYLATION OF HYDROCARBONS

Vladimir N. Ipatieff and Herman Pines, Chicago, Ill., assignors to Universal Oil Products Company, Chicago, Ill., a corporation of Delaware No Drawing. Application March 24, 1941, Serial No. 384,948

11 Claims. (Cl. 260—683.4)

This invention is related particularly to the alkylation of paraffin hydrocarbons by olefinic hydrocarbons in the presence of selected catalysts.

It is more specifically concerned with the alkylation of normal paraffin hydrocarbons, particularly normal butane and n-pentane, with the normally gaseous olefins under conditions conducive to the formation of substantial yields of alkylated products.

It is recognized that the art is familiar with the alkylation of iso paraffin hydrocarbons with olefin hydrocarbons in the presence of various types of catalysts, some of the mineral acid variety including sulfuric and phosphoric acid, and some of the metal halide variety including aluminum chloride, ferric chloride, zirconium chloride, zinc chloride and other metal chlorides of lesser activity either singly or in admixture. However, prior to the development of the process of the present invention there has been no successful direct alkylation of a normal paraffin hydrocarbon with an olefin in the presence of these types of catalysts. The present invention therefore stands as a contribution to the art of alkylating normal paraffin hydrocarbons.

At the present time when it is desired to alkylate a normal paraffin hydrocarbon with an olefin, the preliminary step involves the isomerization of the normal paraffin to an extent corresponding to an increase in reactivity so that the alkylation reaction is more or less readily carried out. Thus, in the case of normal butane, which is produced in excess of vapor pressure requirements in the straight-run and cracking distillation of petroleum, it is common practice to isomerize this compound to iso butane before catalytic alkylation is attempted although some non-catalytic processes are in vogue whereby inter-action is secured directly between normal butane and normally gaseous olefins such as ethylene to produce neo-paraffins such as, for example, neo-hexane (2,2 dimethyl butane) from normal butane and ethylene. The importance of being able to catalytically alkylate normal butane with olefins directly is readily apparent in that the isomerization step can be eliminated and in that considerably lower temperatures and pressure than needed in thermal alkylation can be employed without sacrificing reaction rates. These same considerations apply to a varying extent when alkylation of normal paraffins of higher molecular weight than normal butane is practiced.

In one specific embodiment the present invention comprises a process for alkylating normal butane which comprises subjecting a molal excess of said normal butane in admixture with a normally gaseous olefin to contact with aluminum chloride catalyst in the presence of hydrogen chloride.

While aluminum chloride is usually the preferred catalytic material for use in accelerating the alkylating reactions it is comprised within the scope of the invention to use alternatively other metal halides having an analogous action such as, for example, zirconium chloride, zinc chloride, iron chloride, etc. These materials may be used in granular or powdered form or deposited on granular supports such as fuller's earth or clays, various oxides such as those of aluminum and magnesium and various siliceous refractory materials such as crushed fire-brick and silica, diatomaceous earth, etc. The invention also comprises the use of mixtures of catalytically active metal halides or mixtures of active halides and relatively inactive halides which function principally as diluents to modify the activity of the catalytically active materials.

With suitable modifications the present process is also applicable to the alkylation of normally liquid normal paraffin hydrocarbons beginning with normal pentane although there is a tendency for undesirable side reactions other than the desired alkylation reactions to increase as the molecular weight of the paraffin increases.

The present process may be operated either as a batch or a continuous process although as a rule somewhat better yields are obtained when operating in closed pressure vessels for extended reaction times rather than when continuous operation is practiced by passing a mixture of the vapors of normal butane, a gaseous olefin and hydrogen chloride over a stationary granular mass of aluminum chloride which may if desired be deposited upon relatively inert supporting material such as activated charcoal, activated alumina, pumice, kieselguhr, clays, both raw and acid treated, crushed silica fragments, fire-brick, etc.

As a rule, moderately low temperatures are employed in the present process, these varying from about −30° C. to 130° C.; while pressures and rates of flow vary with the type of operation used. It is also preferable to employ a considerable excess of the normal butane or other normal paraffin in relation to the olefin and accelerated reaction rates may be observed when a small amount of the iso butane is mixed with the normal butane since the energy liberated by the alkylation of this more easily alkylated last named compound is sufficient to activate or energize the normal butane sufficiently to cause it to enter into reaction at an increased rate.

tal data are introduced to indicate the extent of alkylation of normal paraffins possible within the scope of the invention although with no intention of unduly restricting its proper scope. The data is presented in tabular form below.

| Temp., °C. | Catalyst | | Paraffins | | Olefins | | Operation | |
|---|---|---|---|---|---|---|---|---|
| | Kind | Grams | Kind | Grams | Kind | Grams | | |
| 25 | $AlCl_3$ | 25.5 | $n-C_4H_{10}$ $i-C_4H_{10}$ | 69 91 | $C_2H_4$ | 42 | Batch | 13 g. of $n-C_4H_{10}$ entered into reaction. |
| 25 | $AlBr_3$ HBr | 24.6 8.0 | $n-C_4H_{10}$ | 165 | do | | do | 20 g. of n-butane reacted. |
| 25 | $AlCl_3$ $AlBr_3$ | 17.8 8.7 | $n-C_4H_{10}$ | 58.5 | do | 54 | do | Procedure: Stirring bomb maximum pressure 15 atm. 12g. of butane entered reaction. Alkylation takes place. |
| 105 | $AlCl_3$ HCl | 30 7.5 | $n-C_4H_{10}$ | 278 | do | 132 | do | Procedure: Exp. was carried out in a bomb. 30 g. of $n-C_4H_{10}$ reacted. |
| | $AlCl_3$ HCl | 31 7 | $n-C_4H_{10}$ | 330 | do | 131 | do | Bomb experiment. $n-C_4H_{10}$ was heated with the catalyst at 140° for 1 hour. Temperature was dropped to 105°, $C_2H_4$ was added. Alkylation has taken place. |

The types of products yielded by the present process are the type that indicate that both direct alkylation of the normal paraffin molecule and alkylation of the primarily isomerized molecule have taken place, and it is probable that the two reactions occur more or less concurrently. In the batch operations comparatively long time factors and relatively low temperatures are employed. It is further possible that the reaction mechanism involves the primary formation of isomeric hydrocarbons which are then alkylated by olefins. In continuous operations means temperatures are selected which are comprised in the range optimum for isomerization and also within the range found best for alkylation, since these two ranges of temperatures ordinarily overlap. If too high temperatures are used decomposition of alkylated products will occur and if too low temperatures are employed the rate of alkylation of the normal paraffin is slowed down due possibly to the slowing down of the rate of some primary isomerization reaction.

The preferred catalyst for the alkylation reactions is aluminum chloride which may be used as such or as a component of granular supports, and it is found essential to have present a considerable amount of hydrogen chloride in the reaction zone. Aluminum bromide is also found to be an effective catalyst, and this catalyst is also best employed along with hydrogen bromide in considerable amounts. While some effects are observed when using other catalysts of the Friedel-Crafts type, their activities are usually too low in comparison with the activities of the aluminum halides to make their use practical.

It is essential to the successful operation of the present process that definite and regulated amounts of hydrogen and hydrogen chloride be present in the reaction zone. As a rule the exact proportions of hydrogen and hydrogen chloride with respect to the hydrocarbons undergoing reaction will depend upon the activity of the catalyst in use which will vary with its original method of manufacture and the length of time it has been in service. In strictly batch operations the proportions of hydrogen and hydrogen chloride may be introduced into the pressure vessel at the outset of the run while in continuous operations, the proportions may be varied during the processing period.

This application is a continuation-in-part of our copending application Serial No. 268,346, filed April 17, 1939, now Patent No. 2,236,099, which in turn is a continuation-in-part of application Serial No. 35,237, filed August 8, 1935.

The following examples involving experimental data are introduced to indicate the extent of alkylation of normal paraffins possible within the scope of the invention although with no intention of unduly restricting its proper scope. The data is presented in tabular form below.

The following example shows the results obtained in alkylating normal pentane with propene. The hydrocarbon products of the reaction were all saturated indicating the predominance of alkylation rather than dehydrogenation or polymerization reactions.

*Alkylation of n-pentane with propene*

Charge:
- n-Pentane _____grams__ 250
- $AlCl_3$ _____do____ 25
- HCl _____do____ 9.5
- $C_3H_6$ _____do____ 104

Duration of run_____hours__ 2.5
Temperature _____°C__ 30–35
Pressure _____kg./sq. cm__ 6.5–7.5

Products:
- Upper layer _____grams__ 120
- Recovered n-pentane_____do____ [1] 182
- Lower layer _____do____ 60

Distillation:
- 45–75 _____per cent__ 21.7
- 75–96 _____do____ 6.6
- 96–125 _____do____ 15.6
- 125–150 _____do____ 9.0
- 150–175 _____do____ 6.0
- 175–200 _____do____ 11.7
- To 225° total _____do____ 79.0

[1] Contains 10 grams propane and 4 grams isobutane.

We claim as our invention:

1. A process for synthesizing hydrocarbons which comprises subjecting a normal paraffin and an olefin to the action of a metal halide catalyst under alkylating conditions and in the presence of a hydrogen halide.

2. A process for synthesizing hydrocarbons which comprises subjecting a normal paraffin and an olefin to the action of a metal halide catalyst at a temperature of from about −30 to about 130° C. and in the presence of a hydrogen halide.

3. The process of claim 1 further characterized in that the catalyst comprises aluminum chloride.

4. The process of claim 1 further characterized in that the catalyst comprises aluminum chloride and zirconium chloride.

5. The process of claim 1 further characterized in that the catalyst comprises aluminum chloride and zinc chloride.

6. The process of claim 1 further characterized in that the catalyst comprises aluminum chloride and copper chloride.

7. A process for synthesizing hydrocarbons which comprises subjecting normal butane and an olefin to the action of a catalyst comprising aluminum chloride under alkylating conditions and in the presence of hydrogen chloride.

8. A process for synthesizing hydrocarbons which comprises subjecting normal butane and a normally gaseous olefin to the action of aluminum chloride at a temperature of from about −30 to about 130° C. and in the presence of hydrogen chloride.

9. A process for synthesizing hydrocarbons which comprises subjecting normal pentane and an olefin to the action of a catalyst comprising aluminum chloride under alkylating conditions and in the presence of hydrogen chloride.

10. A process for synthesizing hydrocarbons which comprises subjecting a normal paraffin and an olefin to the action of a metal halide catalyst under alkylating conditions and in the presence of a hydrogen halide, said normal paraffin being in molar excess of said olefin.

11. A process for synthesizing hydrocarbons which comprises subjecting a mixture comprising a normal paraffin and an olefin to the action of a metal halide catalyst under alkylating conditions and in the presence of a hydrogen halide.

VLADIMIR N. IPATIEFF.
HERMAN PINES.